United States Patent [19]

Geohegan, Jr. et al.

[11] Patent Number: 4,635,240
[45] Date of Patent: Jan. 6, 1987

[54] SONAR NAVIGATION SYSTEM

[75] Inventors: Kenneth P. Geohegan, Jr., Catonsville; Charles W. Allen, Arnold, both of Md.

[73] Assignee: Westinghouse Electric Corp., Pittsburgh, Pa.

[21] Appl. No.: 716,304

[22] Filed: Mar. 26, 1985

[51] Int. Cl.$^4$ ............ G01S 9/66; G01S 9/68; G01S 15/00
[52] U.S. Cl. .................. 367/89; 367/100; 367/106; 181/123
[58] Field of Search ............ 340/850, 851; 367/88, 367/89, 91, 92, 100, 103, 106, 119, 125, 127, 130, 910; 364/565, 728; 181/123, 124

[56] References Cited

U.S. PATENT DOCUMENTS

| | | | |
|---|---|---|---|
| 3,119,189 | 1/1964 | Hyne | 367/130 X |
| 3,147,477 | 9/1964 | Dickey, Jr. | 367/89 |
| 3,274,546 | 9/1966 | Gunn | 340/851 |
| 4,025,895 | 5/1977 | Shatto | 367/106 |
| 4,047,147 | 9/1977 | Wood et al. | 367/88 X |
| 4,162,474 | 7/1979 | Broder et al. | 340/851 |
| 4,216,537 | 8/1980 | Delignieres | 367/106 X |
| 4,244,026 | 1/1981 | Dickey, Jr. | 367/89 X |
| 4,480,322 | 10/1984 | Orieux | 367/125 X |
| 4,493,064 | 1/1985 | Odero et al. | 367/106 |

*Primary Examiner*—Charles T. Jordan
*Assistant Examiner*—Brian S. Steinberger
*Attorney, Agent, or Firm*—D. Schron

[57] ABSTRACT

A forward look sonar system in which speed and direction of a sonar platform is obtained. Each acoustic transmission towards the target area over which the platform is traveling is comprised of a plurality of frequencies. A plurality of receiver beams is formed and each individual beam from one transmission is cross-correlated with its corresponding beam from a selected subsequent transmission to derive a delay value. The later received signal for each beam, for each frequency is divided into a plurality of small segments each of which is cross-correlated with a portion of the first return signal corresponding to the same frequency and beam. The cross-correlation functions for the plurality of frequencies for each particular segment are added together to obtain a more precise delay value. The correlation functions for each of the beams are added together and compared to derive a value for platform direction in the intercomparison period and the delay values are utilized to derive a velocity indication.

9 Claims, 20 Drawing Figures

4,635,240

SONAR NAVIGATION SYSTEM

BACKGROUND OF THE INVENTION

1. Field of the Invention

The invention in general relates to sonar systems for obtaining velocity magnitude and direction, and particularly to an arrangement which can be used as, or in conjunction with, a forward look multibeam system.

2. Description of the Prior Art

Navigation systems for surface and subsurface vehicles include sonar systems operating independently or in conjunction with an inertial guidance system to obtain indications of vessel velocity and direction.

A fairly high degree of accuracy can be obtained with an inertial guidance system, however such systems are extremely expensive and are subject to a bias error which builds up with time and must be eliminated by utilizing some other velocity reference. Typically, a velocity reference may be provided by an independent sonar system which utilizes Doppler or downlock correlation measuring techniques. These techniques require independent systems which utilize large or specialized transducer configurations which cannot be used in certain types of sonar carrying vehicles generically known as platforms.

For example, in one type of forward look multibeam sonar system which examines the sea floor for targets, the sonar equipment is carried by an underwater platform towed by a surface vessel. The underwater platform includes an inertial guidance unit the output of which must be periodically updated with an accurate velocity reading, and due to the nature of the underwater platform, typical Doppler or downlook correlation systems may not be utilized.

The apparatus of the present invention can be fabricated as an independent unit for obtaining velocity indications or can be used in conjunction with, and as an integral part of, an already existing forward look multibeam search sonar.

SUMMARY OF THE INVENTION

A sonar navigation system is provided in which sonar on a platform forwardly transmits a broadband acoustic signal toward the sea bottom. The signal preferably is comprised of a plurality of different frequencies. Transducer means on the platform receives the acoustic returns resulting from the transmissions and means are provided for forming a plurality of individual receiver beams in response to a single transmission and reception of acoustic energy. Segments of each beam signal from one transmission are cross-correlated with respective corresponding beam signals from another transmission with the cross-correlation generating a delay indication for each segment cross-correlation. The delay indications are utilized to derive a value for platform distance traveled between the two transmissions, from which, knowing the interpulse time period, a velocity indication may be obtained. Cross-correlation functions of all of the segments of the beams are added to derive a cross-correlation amplitude value for each of the beams, with these amplitude values being utilized to derive an indication of platform angular deviation from its travel path from one transmission to the next.

DESCRIPTION OF THE PREFERRED EMBODIMENT

Figure 1:
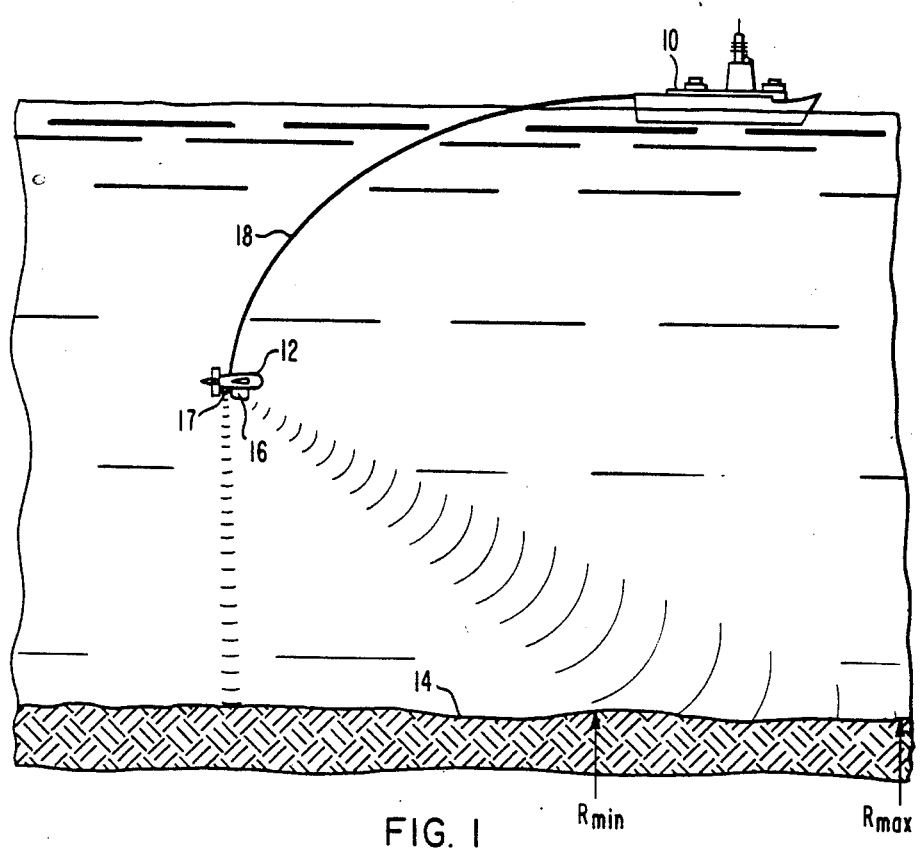
FIG. 1 depicts a sonar arrangement in which the present invention may be utilized.

In FIG. 1 surface vessel 10 is towing an underwater platform 12 carrying sonar equipment for examining a target area such as the sea bottom 14. Platform 12 carries a first sonar 16 for examining the target area ahead of the platform from some minimum range $R_{min}$ to some maximum range $R_{max}$. A second sonar 17 operates as a fathometer to derive the platform's altitude above the sea bottom. Signals for operating the sonars and signals generated by acoustic returns are transmitted between surface vessel 10 and underwater vehicle 12 and vice versa by means of electromechanical tow cable 18.

Figure 2:
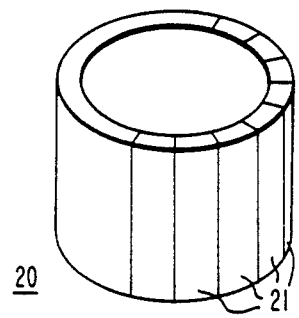
FIG. 2 illustrates one type of transducer array utilized for transmission and reception of acoustic energy.
Figure 3A:
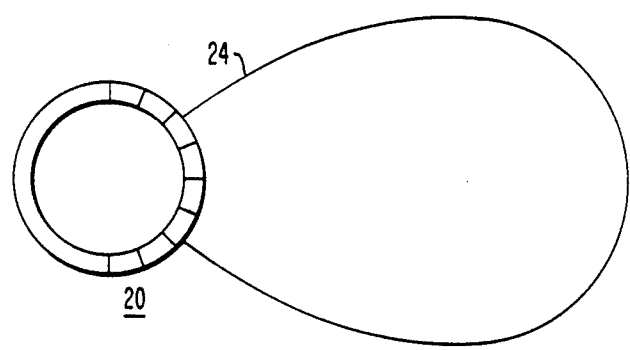
FIG. 3A is a plan view of the transducer of FIG. 2 illustrating its transmitting beam pattern.
Figure 3B:
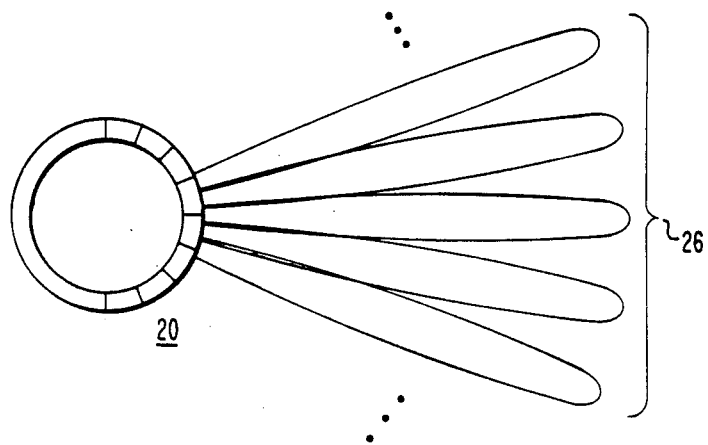
FIG. 3B illustrates the transducer in conjunction with a plurality of receiving beams.

FIG. 2 illustrates the active transducer array portion of the forward look sonar system. Array 20 includes a plurality of elements 21 illustrated as staves, however in most systems the staves themselves may be divided into individual horizontal segments for controlling beam depression angle. As seen in FIG. 3A, array 20 transmits a relatively broad beam as depicted by beam pattern 24 whereas in the receive mode, a plurality of relatively narrow receiver beams 26 are formed, as depicted in FIG. 3B.

Figure 4:
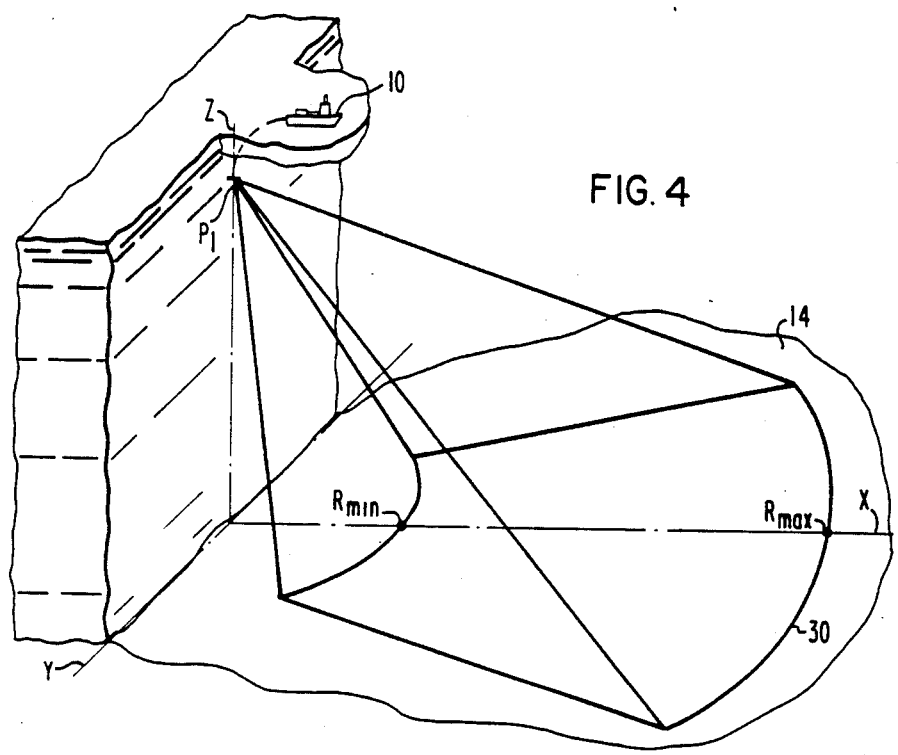
FIG. 4 is a view, in an XYZ coordinate system, of impingement of acoustic energy on a target area.

FIG. 4 illustrates the underwater platform at position $P_1$ on the Z axis of an XYZ coordinate system wherein the XY plane represents the sea bottom 14. A transmitted pulse of acoustic energy impinges on the sea bottom and sweeps out and insonifies a generally trapezoidal area 30.

Figure 5:
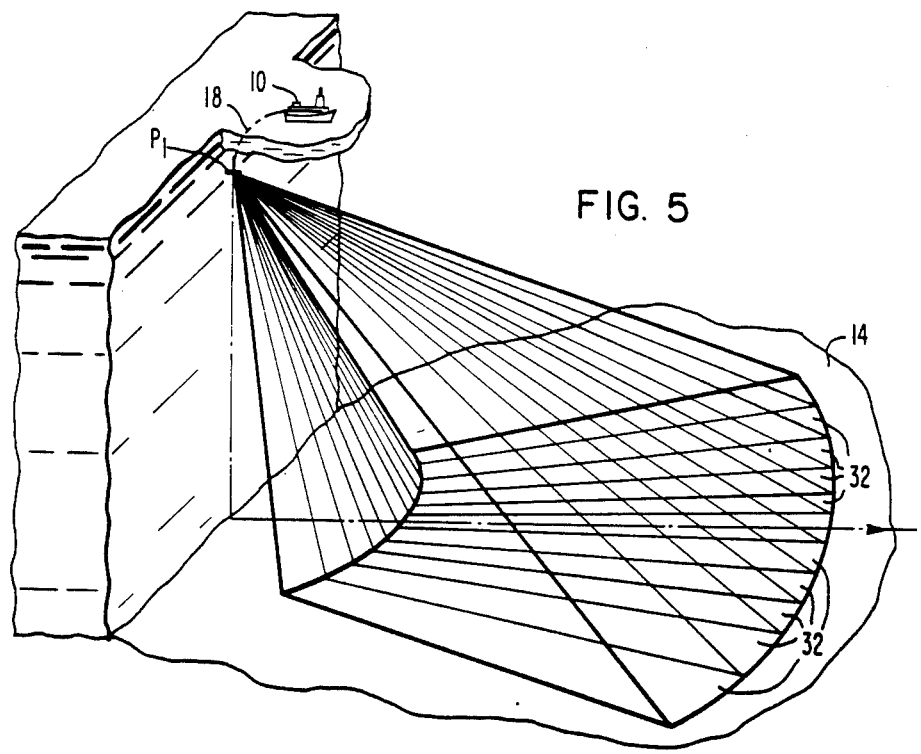
FIG. 5 is a view as in FIG. 4, however illustrating the effective receiver beams for obtaining information relative to the target area.

As depicted in FIG. 5, the transducer at position $P_1$ in conjunction with the receiver apparatus forms a plurality of receive beams whereby information is received from a plurality of individual elongated relatively narrow receiver strips 32 formed on the target area.

Figure 6:
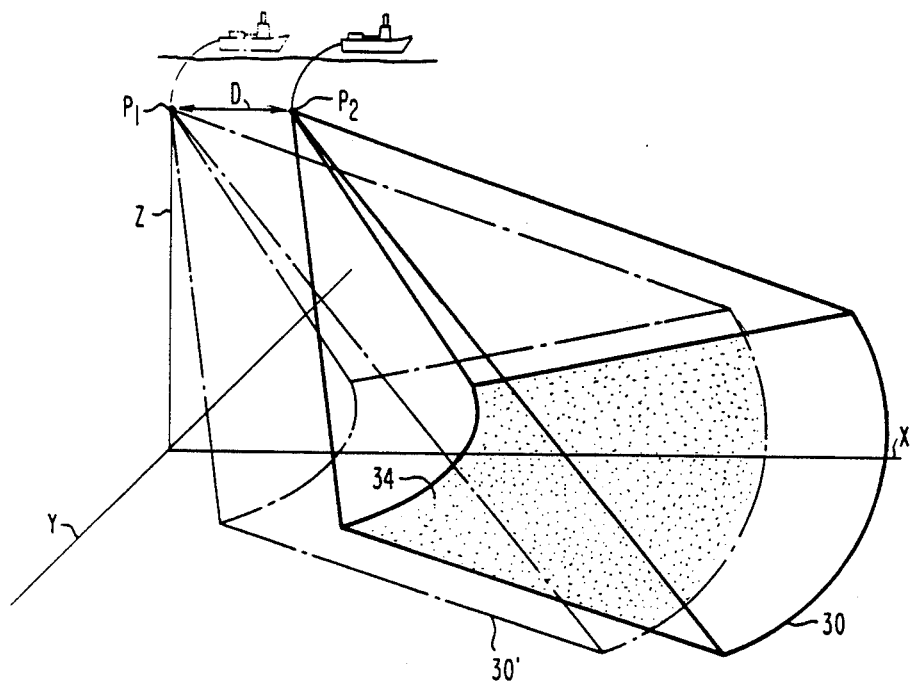
FIG. 6 is a view as in FIG. 4 depicting impingement of acoustic energy resulting from two successive transmissions as the sonar system moves along its course of travel.

The apparatus thus far described is well known and in use as a forward look sonar for examining a target area. In the present invention, returns from two transmissions are processed and compared to provide information relative to speed of the underwater vehicle as well as its direction. FIG. 6 is similar to FIG. 4 with the underwater platform now moved a distance D to position $P_2$ where a new area 30 is insonified. The area previously insonified as a result of the transmission from position $P_1$ is shown in dot-dash line and is designated by the numeral 30'. The overlap of the two insonified areas is shown dotted and is designated by the numeral 34. Acoustic returns from the first and the subsequent transmission at approximately the same angle of incidence will be very similar for the common area 34 and, accordingly, will be highly correlated. Analysis of this correlation in the present invention is performed to derive not only speed information for the underwater vehicle, but directional information as well.

Figure 7:
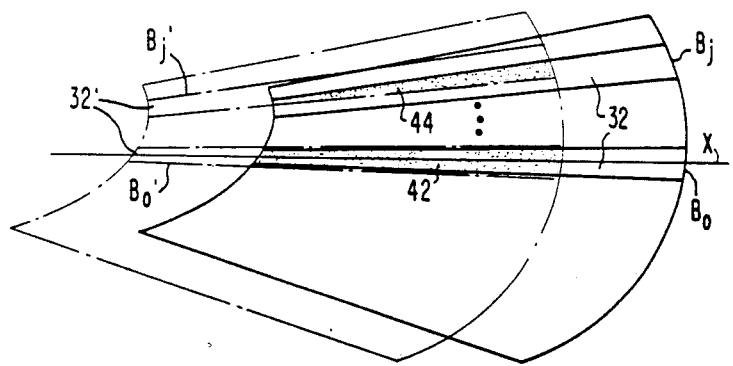
FIG. 7 depicts the overlap of two successive receiver beam strips on the target area.

The correlation is performed on each pair of receiver beams resulting from first and the subsequent transmission. FIG. 7 illustrates a receiver strip 32 associated with a center beam $B_0$ lying along the X axis. Receiver strip 32 associated with another beam $B_j$ is also illustrated and lies at an angle relative to the X axis. Corresponding beams to be correlated resulting from a previous transmission are designated by primed reference characters. Common overlap area 42 of the $B_0$ beam pair is greater than the common overlap area 44 of the $B_j$ beam pair and, accordingly, will be more highly correlated. By determining the time delay for peak correlation and the amount of correlation of each beam pair, the speed and direction of the underwater vehicle may be determined to a high degree of accuracy.

Figure 8:
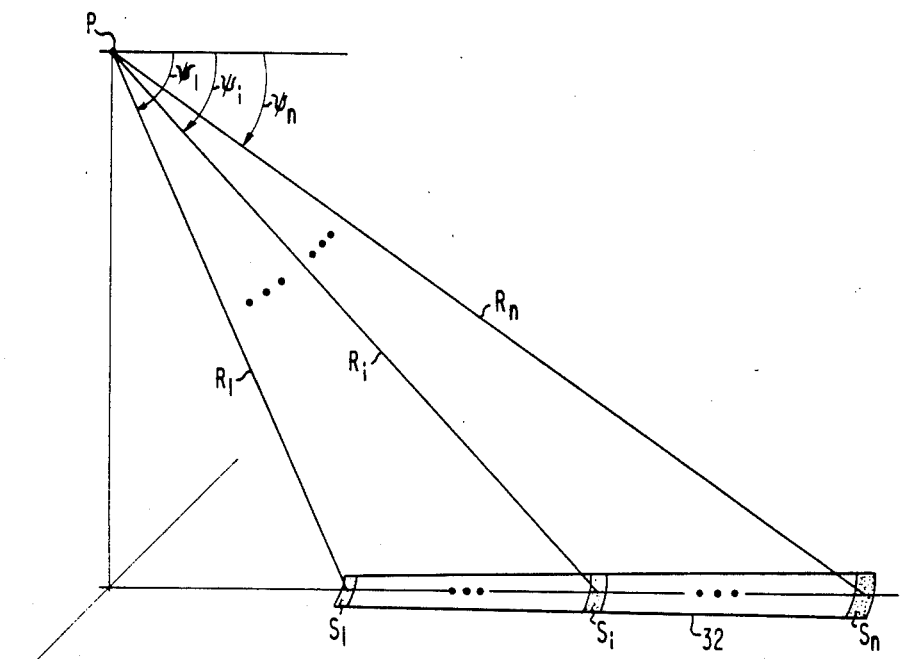
FIG. 8 illustrates various parameters associated with a receiver strip on the target area.

In order to provide for a more accurate correlation, and accordingly a more precise velocity measurement, acoustic return from one of the transmissions, for example the subsequent one, is divided into segments, with each segment being correlated with a portion of the previous return. Any correlation error is reduced by averaging all of the correlation functions. For example, FIG. 8 illustrates a receiver strip 32 relative to the transducer at position P. Segment $S_1$ represents an elemental area of the receiver strip at a slant range of $R_i$ at a depression angle of $\psi_i$. As the transmitted pulse impinges upon the target area, acoustic returns are received on a time basis from the elemental areas $S_i$ where i goes from 1 to n, illustrated in FIG. 8 with corresponding slant ranges and depression angles.

Figure 9A:
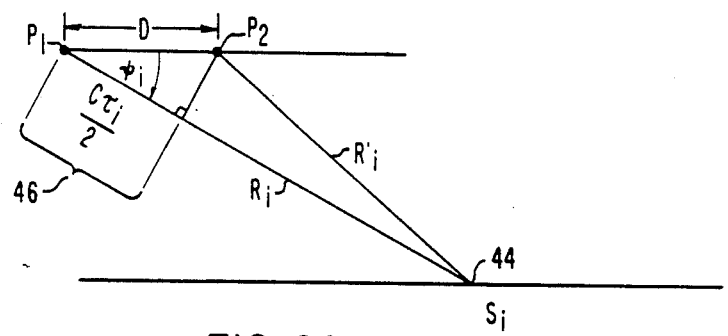
FIGS. 9A, 9B and 10 illustrate geometric relationships for deriving certain equations.
Figure 9B:
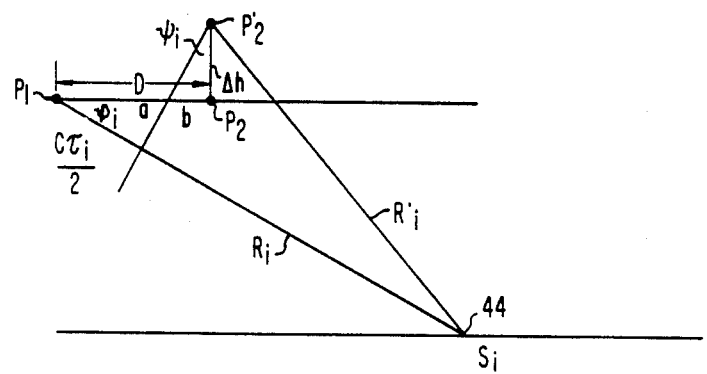

FIGS. 9A and 9B serve to explain the derivation of the equation for deriving vehicle velocity. In FIG. 9A, $R_i$ is the slant range from position $P_1$ to point 44 of segment $S_i$, while $R'_i$ is the range from that same point to position $P_2$ displaced at a horizontal distance of D from position $P_1$. If $\tau_R$ is the time it takes for an acoustic transmission to travel the distance $R_i$ to point 44 and back, then the slant range in terms of $\tau$ is given as:

$$R_i = \frac{C\tau_R}{2} \quad (1)$$

and $$R'_i = \frac{C\tau_{R'}}{2} \quad (2)$$

To a good approximation, the line segment 46 is equal to the difference in the slant ranges, that is, equation (1) minus equation (2) yielding:

$$R_i - R'_i = \frac{C}{2}(\tau_R - \tau_{R'}) = \frac{C\tau_i}{2} \quad (3)$$

where $\tau_i$ represents the difference in travel times along the $R_i$ and $R'_i$ paths. A measure of the similarity between the two signals from point 44 received at position $P_1$ from one transmission and at $P_2$ on a subsequent transmission is defined by a cross-correlation function which in a well-known manner defines the delay time with respect to one another. Accordingly, from geometric considerations, the distance D between positions $P_1$ and $P_2$ is defined as:

$$D = \frac{C\tau_i}{2 \cos \psi_i} \quad (4)$$

In an actual undersea environment, the underwater platform may not travel in a straight horizontal line as depicted in FIG. 9A, but may in actuality be also vertically displaced from one transmission to the next. This situation is depicted in FIG. 9B wherein the vehicle is at position $P_1$ for first transmission and in position $P'_2$ for the subsequent transmission, $P'_2$ being vertically displaced from $P_2$ by a distance $\Delta h$. Under the conditions of FIG. 9B, the distance D is divided into two parts, a and b, such that:

$$D = a + b \quad (5)$$

Segment a is equal to:

$$a = \frac{C\tau_i}{2 \cos \psi_i} \quad (6)$$

and segment b is equal to:

$$b = \Delta h \tan \psi_i \quad (7)$$

so that:

$$D = a + b = \frac{C\tau_i}{2 \cos \psi_i} + \Delta h \tan \psi_i \quad (8)$$

If each $\tau_i$ as well as each $\psi_i$ for each respective segment is inserted in equation (8), an average value for the distance D may be obtained. $\Delta h$ may be determined from integration of a vertical accelerometer of an inertial guidance unit. With the knowledge of the time $\Delta t$ between transmissions for which comparisons are made, and the number of segments n, a velocity magnitude indication may be derived as in equation (9) where the expression in parentheses is the value for D in equation (8). The term in brackets is divided by n resulting in an average value of D. Division by $\Delta t$ in equation (9), therefore, results in a velocity indication V since velocity=distance÷time. This operation may be performed for each beam and the results averaged to yield an average velocity magnitude indication.

$$V = \frac{1}{n\Delta t}\left[\sum_{i=1}^{n}\left(\frac{C_{T_i}}{2\cos\psi_i} + \Delta h \tan\psi_i\right)\right] \quad (9)$$

Figure 10:
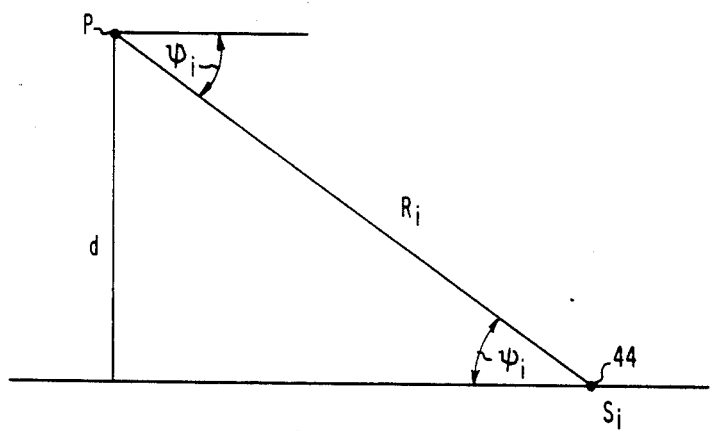

FIG. 10 serves to illustrate the derivation of angle $\psi_i$ for use in equation (9). Position P is at a slant range of $R_i$ from point 44 and is at an altitude d above the sea bottom. If $\tau_{Ri}$ represents the time for acoustic energy to return to point P after transmission and subsequent reflection from point 44, then the slant range $R_i$ is given as:

$$R_i = \frac{C_{T_{Ri}}}{2} \quad (10)$$

from geometric considerations:

$$\sin\psi_i = \frac{d}{R_i} \quad (11)$$

substituting for the value of $R_i$ from equation (10):

$$\psi_i = \sin^{-1}\frac{d}{\frac{C_{T_{Ri}}}{2}} \quad (12)$$

The value of d in equation (12) is obtained from the fathometer carried by the underwater platform and it is seen that angle $\psi_i$ varies as a function of slant range which, in turn, is simply a function of time of receipt of acoustic energy after a transmission.

In the present invention, velocity determinations are made by comparing the acoustic returns resulting from two pulse transmissions. Acoustic returns from the same patch of target area are cross-correlated to derive a time difference or delay value for use in a velocity determining equation.

With respect to the transmitted acoustic signal, large pulse length allows for the measurement of relatively high velocities, however, a small pulse length is needed to minimize errors due to the fact that the angle of incidence between the two acoustic pulses impinging upon the target area are different. Additionally, the transmitted signal must have a wide bandwidth in order to minimize the width of the correlation function so as to achieve high accuracy. These stated objectives for a transmitted acoustic signal may be accomplished by transmitting a plurality of continuous wave (CW) pulses at different frequencies, with each being of an optimum pulse length. The return signal includes each frequency which is processed separately to achieve the advantages of a short pulse length and in addition, more power may be transmitted with the multifrequency signal than can be with a short broadband pulse.

Figure 12:
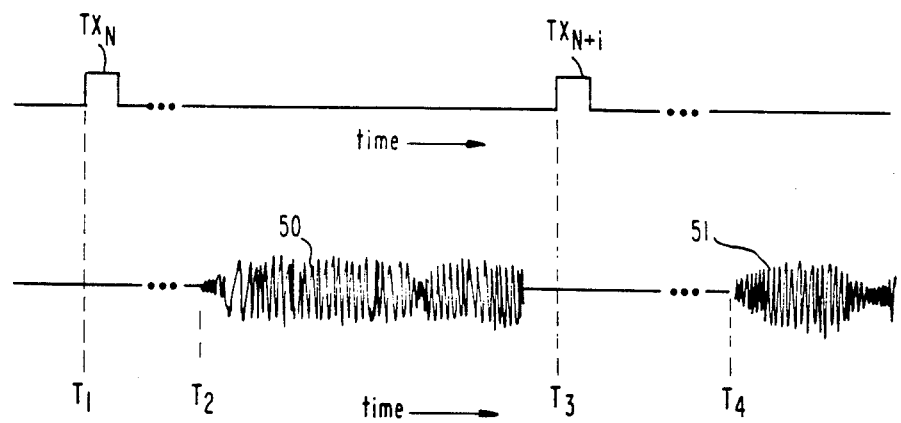
FIG. 12 illustrates time relationships between transmission and reception of acoustic energy.
Figure 11:
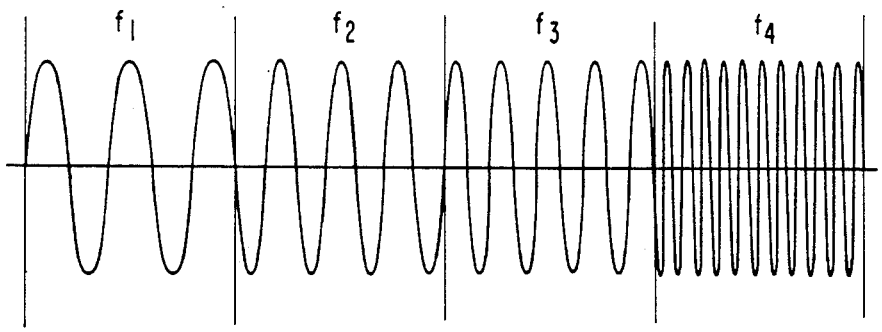
FIG. 11 is an example of a transmitted signal in accordance with the present invention.

FIG. 11 illustrates a typical transmitted acoustic signal. The transmitted pulse is made up of individual subpulses with four being illustrated by way of example and having respective frequencies $f_1$, $f_2$, $f_3$, and $f_4$ where $f_1 < f_2 < f_3 < f_4$. The relationship between the transmitted pulse and the return signal is illustrated in FIG. 12.

A pulse designated $TX_N$ is a multifrequency pulse such as illustrated in FIG. 11 transmitted at time $T_1$. The transmitted pulse impinges upon the sea bottom and sweeps out an insonified area, the returns from which are received on a time basis starting at time $T_2$. The acoustic returns are processed to form multiple beams and waveform 50 in FIG. 12 is representative of one beam and is a complex waveform which includes the plurality of transmitted frequencies. At time $T_3$ a subsequent multifrequency pulse, $TX_{N+i}$ is transmitted, which results in a return signal 51 commencing at time $T_4$ and a portion of which will be highly correlated with return signal 50 from the previous transmission since a portion of the returns are from a common area as depicted in FIG. 7. As used herein the subsequent transmission for which returns are correlated may be the very next transmission after $TX_N$, in which case the value of i for $TX_{N+i}$ would be 1; i, however, may be any integer depending upon platform speed, pulse repetition frequency and ranges.

Figure 13:
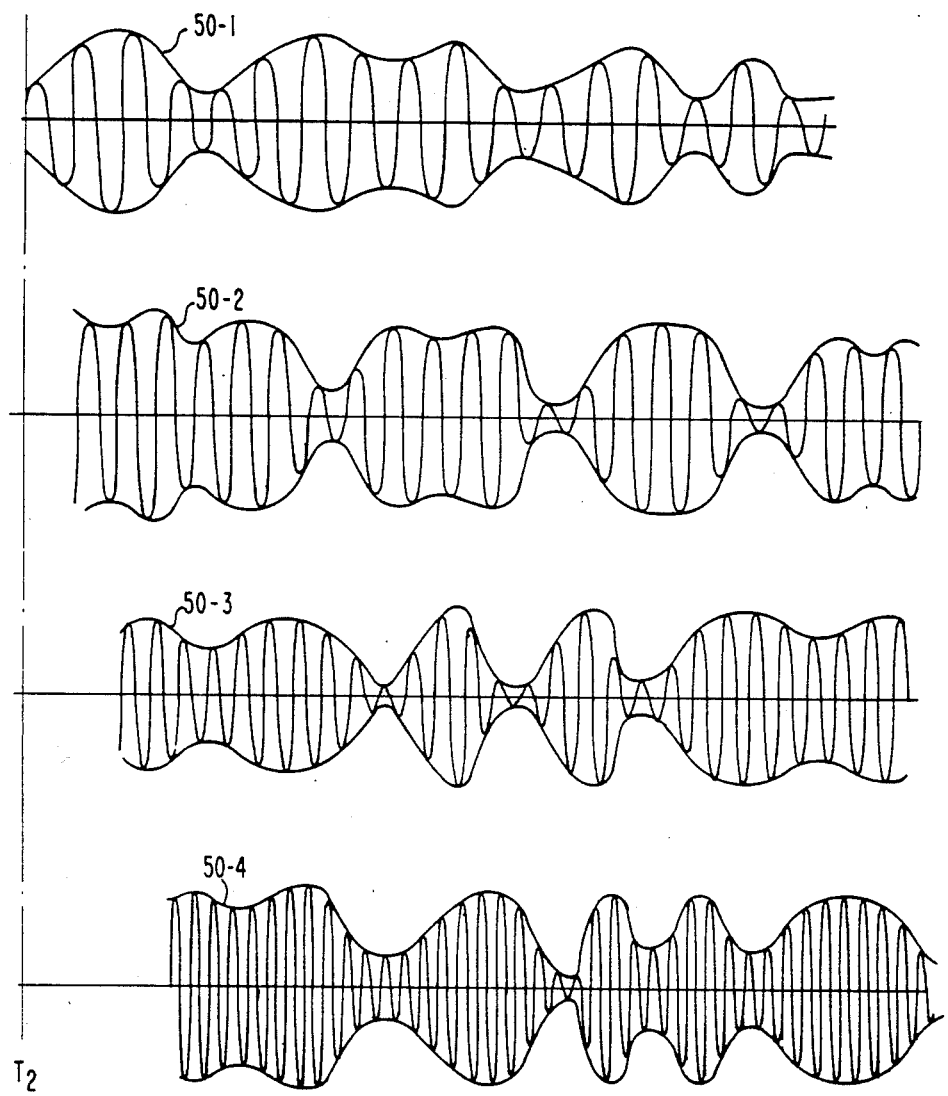
FIG. 13 depicts various components of a received signal resulting from the transmission of a signal of FIG. 11.

As was stated, the return signal such as waveform 50 is a complex waveform made up of the different transmitted frequencies. in FIG. 13, waveform 50-1 represents the $f_1$ component of the return signal as applied to one beam and modulated in accordance with the acoustic scatterers of the particular receiver strip associated with that same beam. Waveforms 50-2 to 50-4, respectively, represent $f_2$, $f_3$ and $f_4$ components of the return signal, each being slightly delayed relative to its predecessor by an amount approximately equivalent to the subpulse width of the transmitted signal.

Figure 14:
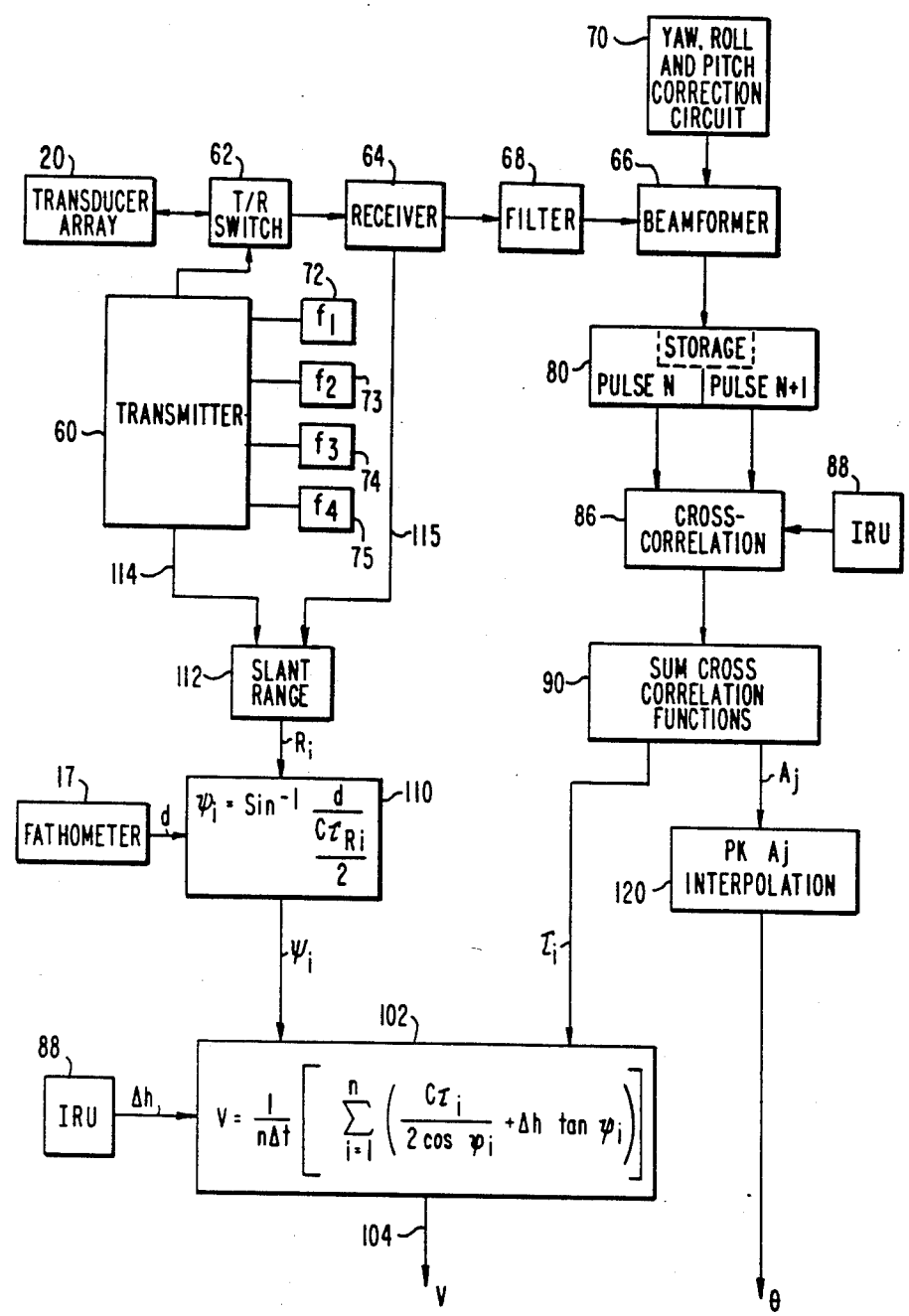
FIG. 14 is a block diagram illustrating the operation of one embodiment of the present invention.

FIG. 14 is a block diagram illustrating one way in which the present invention may be implemented. A transmitter 60 provides a broadband pulse to transducer array 20 through transmit-receive (T/R) switch 62. Acoustic returns received by transducer array 20 are provided through T/R switch 62 to receiver apparatus 64 for amplification and any desired preprocessing.

Beamformer 66 is operable in a well-known manner to derive individual beam signals, each representing the return from an individual receiver strip as depicted in FIG. 5. The transmission, reception and beamforming are traditionally performed in forward look sonars, however in accordance with the present invention, multiple frequencies are transmitted on each acoustic pulse and accordingly a filter 68 is incorporated to separate the acoustic returns into individual frequency components. The filtering function is illustrated as being performed between the receiver and beamformer, however such function can be performed prior to the receiver and even subsequent to the beamformer.

In order to perform the correlation to be described, it is necessary that the correlation be performed on return signals of the first and subsequent pulse transmissions as received from the same bottom strip. This will not be accomplished if the underwater platform carrying the transducer array is oriented in a different direction from the first pulse transmission to the other. Accordingly, there is provided a yaw, roll and pitch correction circuit 70 which is responsive to yaw, pitch and roll sensor signals (not illustrated) to steer the beams resulting from the other transmission into alignment with those of the first transmission, if required.

The output of beamformer 66 is comprised of a number of beam signals each beam signal having a plurality of frequency components. Let it be assumed by way of example that eleven beams are formed and four frequencies are utilized in the transmitted pulse, as indicated by oscillators 72 to 75, and that returns from adjacent transmissions are correlated.

The output of beamformer 66 is placed into storage 80 which stores the 44 individual signals (11 beams×4 frequencies) resulting from the pulse N transmission and stores the subsequent 44 signals resulting from the pulse N+1 transmission.

Since the angle of incidence with the sea bottom of pulse N+1 is slightly different than that of pulse N, the return from one of the pulses is divided into segments roughly corresponding to segments $S_i$ to $S_n$ of FIG. 8 before correlation is performed so as to minimize errors. For example, and with additional reference to FIG. 15, waveform 82 may represent a beam j return from pulse N+1 for one particular frequency, while waveform 83 represents the beam j return from pulse N for that same frequency. Waveform 82 is divided into a plurality of segments, $t_0$ to $t_1$, $t_1$ to $t_2$, $t_2$ to $t_3$, etc. Each such segment from the second return 82 will be cross-correlated with the return 83 from the first pulse, in cross-correlation circuit 86.

In order to reduce the number of computations to be performed in the cross-correlation function, an inertial reference unit 88 may be provided to give a rough estimate of the speed and direction of motion so as to approximate when correlation should occur. Thus, instead of correlating each segment of waveform 82 with the entire waveform 83, each segment may be correlated with a portion thereof determined by the rough estimate provided by inertial reference unit 88. Cross-correlation circuit 86 therefore will correlate segment $t_0$ to $t_1$ with the portion of waveform 83 from A to B. Segment $t_1$ to $t_2$ will be correlated with the portion from C to D, segment $t_2$ to $t_3$ with the portion from E to F, segment $t_3$ to $t_4$ with the portion from G to H, etc.

Figure 15:
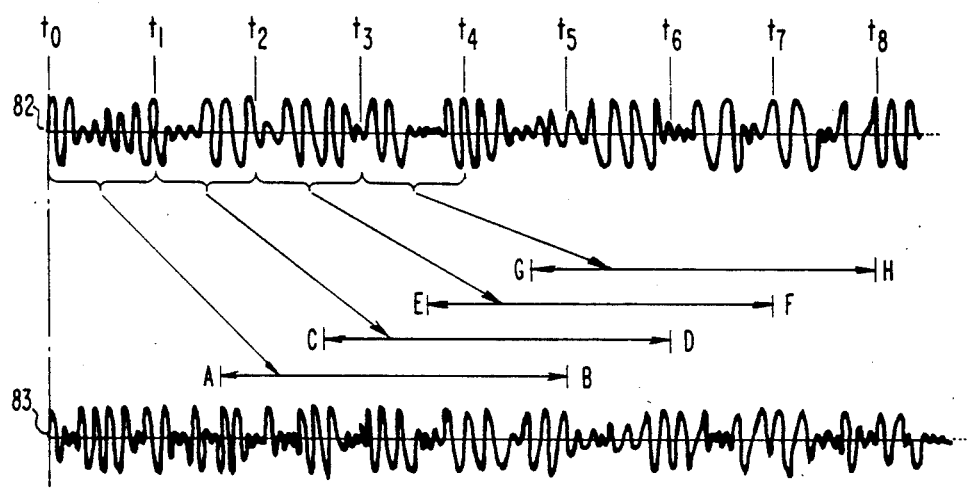
FIG. 15 are waveforms to explain the correlation operation performed in FIG. 14.

FIG. 15 illustrates the correlation for one frequency. In the present example, four such correlations will be performed for each beam. As is well known, the cross-correlation process for each segment will generate a correlation function indicative of the time delay between the two signals correlated.

The results of the cross-correlation are provided to circuit 90 which is operable to add the four correlation functions for each segment in order to obtain a narrower correlation function and a more precise value for a delay time. This process is illustrated in FIG. 16.

Figure 16:
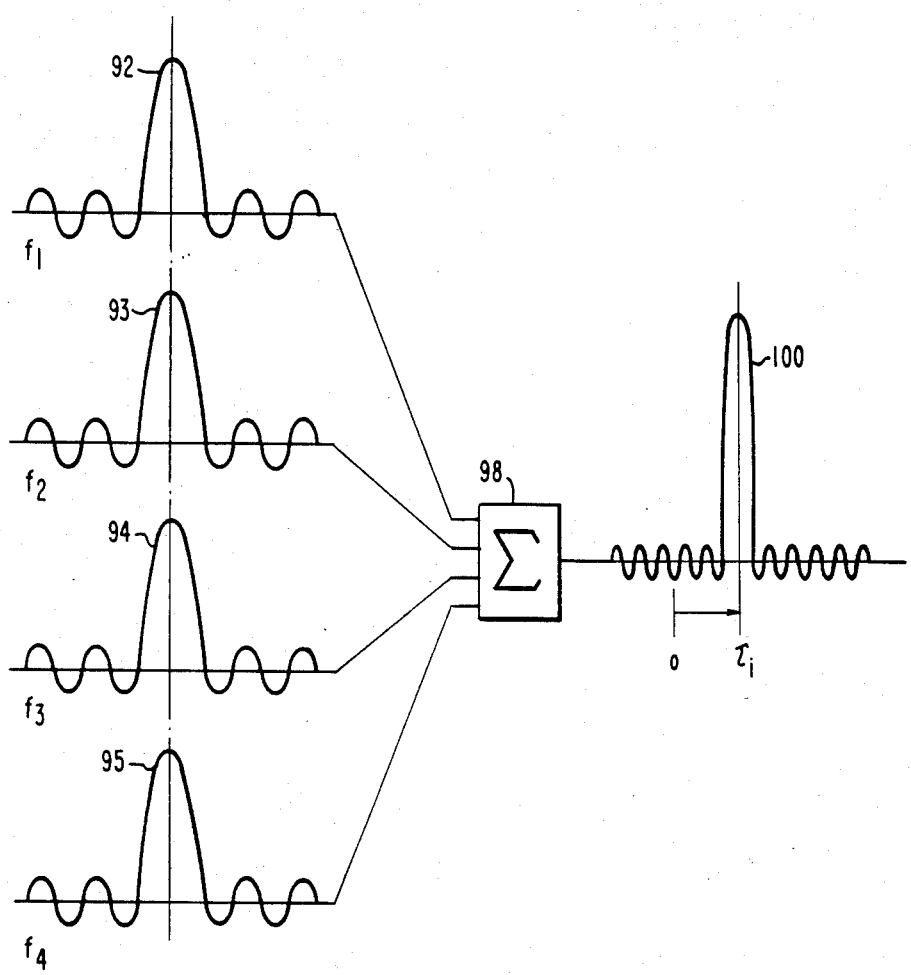
FIG. 16 illustrates the addition of various correlation functions.

In FIG. 16 four correlation functions 92 to 95 are illustrated respectively representing the correlation function generated as a result of the cross-correlation of a segment i for the frequencies $f_1$ to $f_4$. Summation circuit 98 adds all of these correlation functions by a complex operation which includes phase and magnitude information to obtain a narrower resultant correlation function 100 with lower sidelobes relative to the peak amplitude from which the delay time $\tau_i$ is obtained for that particular segment.

Returning once again to FIG. 14, each calculated $\tau_i$ is provided to computation circuit 102 which is operable to implement equation (9) to derive for each beam, a velocity indication V and to average the velocity indications to provide an output signal on line 104 indicative of the platform's speed. In implementing equation (9), circuit 102 receives a value of $\psi_i$ for the particular segment i from circuit 110 which implements equation (12) as a result of depth indication d from fathometer sonar 17 and a slant range indication $R_i$ from circuit 112. This latter value $R_i$ may be obtained by slant range circuit 112 with the provision of an internal clock and the knowledge of time of transmission on line 114 from transmitter 60 and time of reception on line 115 from receiver 64. A value of $\Delta h$ is provided by inertial reference unit 84.

Although returns from pulse pair N and N+1 are cross-correlated, not every pulse pair need be correlated during travel of the platform. For example, at relatively low speeds, a first pulse pair may be correlated to derive a velocity indication subsequent to which many acoustic transmissions may take place without the necessity for deriving an updated velocity indication, since velocity is not changing very rapidly. Under such circumstances, for example, every fifth pulse pair may be examined. At speeds approaching the maximum velocity of the platform, every second pulse pair may be examined to provide for a more rapid update of the velocity although such values are given merely by way of example and would depend upon the actual application. Alternatively, i in the expression N+i may be selected so that every pulse pair N and N+i is examined, regardless of platform speed.

Figure 17A:
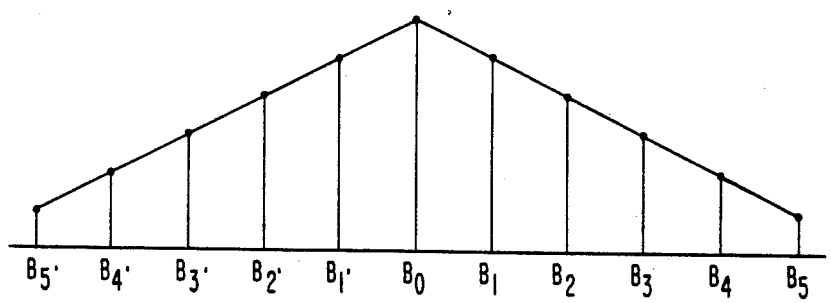
FIGS. 17A and 17B are curves to illustrate the derivation of velocity direction.

Since velocity is a vector having both magnitude (speed) and direction, the direction of the platform must also be determined in addition to its velocity V. To accomplish this, summation circuit 90 is additionally operable to sum the correlation functions of all the individual beams j so as to obtain, for the present example, eleven correlation functions, one for each beam, each function being of a certain amplitude A. These amplitudes are provided to circuit 120, which is operable to perform any one of a number of well-known curve-fit functions to the amplitude values to derive an angle $\theta$ indicative of platform direction. For example, let it be assumed that motion is in the direction of the X axis such that beam $B_0$ will yield the highest correlation as depicted in FIG. 17A wherein the remaining beams have amplitudes of diminishing value and are symmmetrically disposed about the maximum. Circuit 120 will interpret such relationship to derive an angle $\theta$ equal to zero degrees indicating that motion is along the X axis.

Figure 17B:
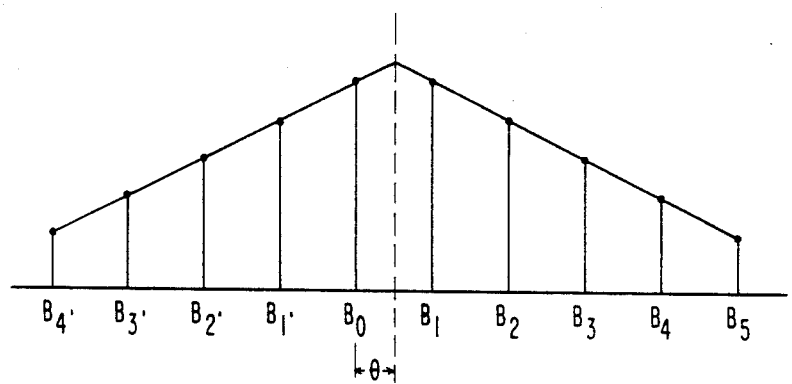

If the amplitudes are not symmetrically disposed such as depicted in FIG. 17B, then the curve-fit function will generate a peak, for example somewhere between $B_0$ and $B_1$ wherein $\theta$ will have some positive value.

Accordingly, a sonar navigation system for deriving velocity magnitude and direction of the sonar platform has been described, and which may be fabricated as an indpendent system or incorporated into an existing forward look sonar system. The described functions performed by the apparatus are well-known state of the art computations and in a preferred embodiment may be performed by a digital computer, in which case the signals described herein would be converted into digital form for the signal processing.

We claim:

1. A sonar navigation system comprising:
  (A) sonar means on a sonar platform operable to forwardly transmit a broadband acoustic signal toward the bed of a body of water over which the platform is traveling and to repeat the transmission of said signal in repetitive transmission cycles, during the course of said travel;
  (B) means on said platform for receiving acoustic returns resulting from said transmissions;
  (C) means forming a plurality of individual receiver beam signals in response to a single transmission and reception;
  (D) means for cross-correlating segments of each beam signal from one transmission with respective corresponding beam signals from another transmission to derive a delay indication for each said segment cross-correlation;

(E) means responsive to said delay indications to derive a velocity value indicative of platform speed;

(F) means responsive to said cross-correlation of all of said segments of all of said beams to derive a cross-correlation amplitude value for each said beam;

(G) means responsive to all of said beam amplitude values to derive a value for platform angular deviation from its travel path, from one transmission to a next.

2. Apparatus according to claim 1 wherein:

(A) each of said transmitted acoustic signals includes a plurality of different frequencies.

3. Apparatus according to claim 2 wherein:

(A) each of said transmitted acoustic signals is a relatively short pulse comprised of subpulses of different frequencies;

4. Apparatus according to claim 3 wherein:

(A) each said segment of said beam signal is cross-correlated with only a portion of said corresponding beam signal from said another transmission.

5. Apparatus according to claim 4 which includes:

(A) means for determining the approximate distance travelled by said sonar means between one transmission and the next;

(B) means responsive to said approximate distance to determine said portions.

6. Apparatus according to claim 4 wherein:

(A) each segment of said beam signal is cross-correlated with only a portion of a corresponding beam signal from a previous transmission.

7. Apparatus according to claim 3 wherein:

(A) a beam signal is derived for each one of said different frequencies.

8. Apparatus according to claim 1 which includes:

(A) means to obtain an indication of platform yaw;

(B) means responsive to said yaw indication to insure that a beam signal corresponding to a beam $B_j$ from one transmission is cross-correlated with the beam signal corresponding to beam $B_j$ from said another transmission, when $B_j$ represents any beam.

9. Apparatus according to claim 1 wherein:

(A) said platform is a towed underwater body.

* * * * *